United States Patent [19]

Dean, II

[11] Patent Number: 4,522,304
[45] Date of Patent: Jun. 11, 1985

[54] SHOCK MOUNT APPARATUS
[75] Inventor: Walter C. Dean, II, Collegeville, Pa.
[73] Assignee: The Budd Company, Troy, Mich.
[21] Appl. No.: 369,652
[22] Filed: Apr. 19, 1982
[51] Int. Cl.³ .................. F16F 15/00; B65D 81/08
[52] U.S. Cl. ................... 206/591; 206/521; 248/621; 248/632; 267/141
[58] Field of Search ............ 206/521, 586, 591; 248/621, 632, 634, 638; 267/63 R, 136, 141, 141.1

[56] References Cited

U.S. PATENT DOCUMENTS

| 2,357,120 | 8/1944 | Kuebert et al. | 248/632 |
| 3,052,435 | 9/1962 | Roller | 248/621 |
| 3,690,540 | 9/1972 | Hardigg | 206/591 |
| 3,701,465 | 10/1972 | Richter | 206/586 |

FOREIGN PATENT DOCUMENTS

| 1155155 | 9/1957 | France | 267/141 |
| 1411104 | 6/1965 | France | 267/141.1 |
| 0399086 | 1/1966 | Switzerland | 248/632 |

Primary Examiner—George E. Lowrance
Assistant Examiner—Jimmy G. Foster
Attorney, Agent, or Firm—Edward M. Farrell; Herman Foster; Thomas I. Davenport

[57] ABSTRACT

A shock mount assembly for holding a component includes three sets of elastomeric members with each of the sets being disposed at right angles with respect to each other. One set of members is primarily in compression with the other two being primarily in shear resulting in deflections being the same regardless of the directions of applied external forces.

4 Claims, 3 Drawing Figures

SHOCK MOUNT APPARATUS

BACKGROUND OF THE INVENTION

Shock mounts are well known and have taken a wide variety of different forms. Such shock mounts are designed to protect or isolate components from applied external forces. Excessive applied forces tend to deflect and damage the components involved and therefore require attenuation of shock loadings.

In shipping critical parts, it is generally desirable to include suitable shock mounts inside of the containers including the components. Sometimes it is important that the shock mounts be included on skids or other carriers where the components are often subjected to movements involving high forces.

One of the problems associated with many shock mounts is that they have different spring rates and consequently different isolation characteristics and resonant frequencies in different directions of loading. For example, a typical shock mount may have a rate in compression which is five times the rate in shear.

The direction sensitive characteristic presents a problem if a component must be isolated from shock and vibration in any direction since the response will not be uniform resulting in excessive force or excessive deflections in the system.

Another problem in present shock mounts is that they are generally designed to handle one weight of component for a given response. This limits the use of the shock mounts to a specific piece of equipment or component.

OBJECTS OF THE INVENTION

It is an object of this invention to provide an improved shock mount assembly that has the same spring rate for all directions of an applied force of the same magnitude.

It is a further object of this invention to provide an improved spring mount assembly capable of meeting the same response requirements using different weight components.

BRIEF SUMMARY OF THE INVENTION

In accordance with the present invention, shock mounting apparatus includes means for receiving a component to be protected against shock and vibration and adapted to be secured within a container or other carrier frame, such as a skid. The shock mounting apparatus includes three sets of similar type elastomeric members disposed in three different planes with respect to each other. The three sets of elastomeric members are disposed so that one set is always primarily in compression while the other two are always primarily in shear. This results in a deflection of the shock mount apparatus that for a given force level is a constant regardless of the direction of the applied force.

Other objects and advantages of the present invention will be apparent and suggest themselves to those skilled in the art, from a reading of the following specification and claims, taken in conjunction with the accompanying drawing.

DETAILED DESCRIPTION OF THE PREFERRED EMBODIMENTS

Figure 1:
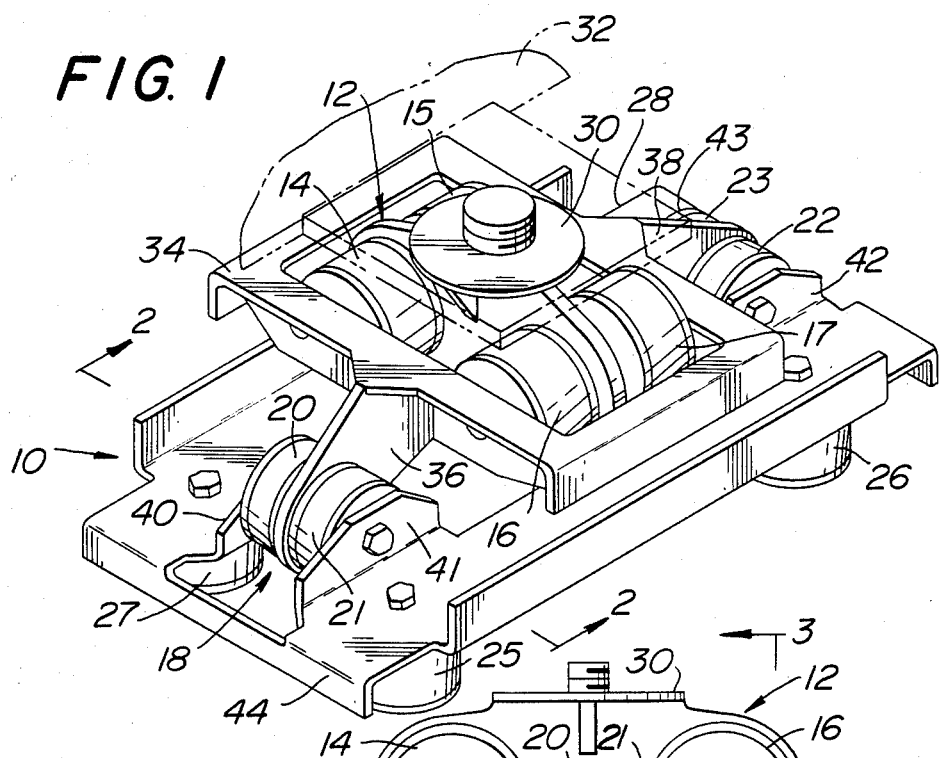
FIG. 1 is an isometric view of shock mounting apparatus in accordance with the present invention.

Referring to the drawings, a single shock mount apparatus 10 is illustrated. It is recognized that in many applications, three or four of similar type mount assemblies would be required to provide a stable support for the components to be protected. Because all of the different mount assemblies would be substantially the same, only one will be described in detail because it is the shock mount apparatus itself which relates to the present invention and not the overall system including the manner in which the components or equipment is packed or mounted.

The shock mount apparatus comprises twelve substantially identical elastomeric isolators arranged as illustrated in FIG. 1. The twelve elastomeric isolators may be considered as three separate sets of four isolators with each set comprising a pair of elastomeric isolators. For example, a first set of isolators 12 comprises a pair of mount elements 14 and 15 and a second pair 16 and 17. A second set of elastomeric isolators 18 comprises a pair of mounts 20 and 21 and a pair of mounts 22 and 23. A third set of elastomeric members 24 may comprise a pair of mounts 25 and 26 and a pair of mounts 27 and 28.

A component mounting plate 30 is connected to the first set of elastomeric members 12. Portions of the plate are connected between the pair of elastomeric members 14 and 15 at one side and between the pair of elastomeric members 16 and 17 on the other side in the manner illustrated. The component to be isolated or protected is illustrated generally by a dotted line 32. This component may be some critical item such as a motor or transmission system or other component to be protected against vibration. The opposite sides of the elastomeric members 14, 15, 16 and 17 are connected to a first intermediate frame 34.

The intermediate frame 34 includes a pair of extending portions 36 and 38. The elastomeric members 20, 21, 22 and 23 are connected on one side to the extending portions 36 and 38. The second set of elastomeric members 18 is disposed perpendicular to the first set of elastomeric members 12.

The other sides of the elastomeric members 20, 21, 22 and 23 are attached to upwardly extending portions 40, 41, 42 and 43 extending from a second intermediate frame member 44.

The intermediate frame member 44 is supported by a third set of elastomeric members 24 comprising the members 25, 26, 27 and 28. The third set of members 24 is attached in a plane perpendicular to the mounting planes of the first and second sets 12 and 18. The other sides of the third set of elastomeric members 24 form the base mounting plane for the assembly. The assembly may be mounted to a skid or floor or other structural body 46.

Figure 2:
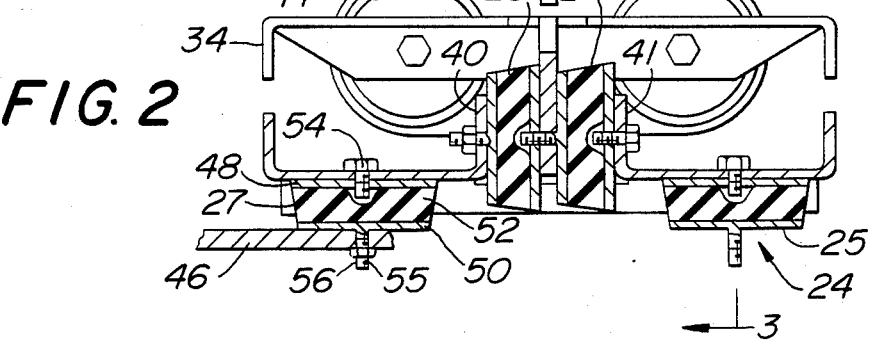
FIG. 2 is a cross-sectional view taken along lines 2—2 of FIG. 1.
Figure 3:
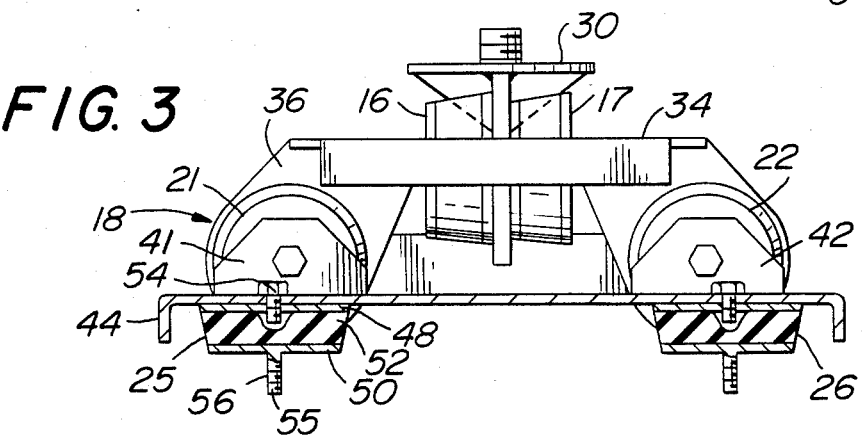
FIG. 3 is a cross-sectional view taken along lines 3—3 of FIG. 2.

A typical elastomeric shock mount illustrated is conventional, for example, the shock mount 27 illustrated in FIG. 2. The mount assembly 27 comprises an inner plate 48 and an outer plate 50 having an elastomeric material 52 disposed or bonded thereto between the plates. The elastomeric member 52 is tapered slightly for manufacturing considerations. A threaded opening is provided in the top plate 48 to receive a screw 54 to permit mounting of the shock mount to the particular part involved such as the intermediate frame 44. In like manner, a threaded portion 55 extends from the outer plate 50 to a nut 56 to permit mounting to the structural body 46.

All of the elastomeric members involved are substantially the same as that described in connection with the mount 27 in FIG. 2. This permits convenient mounting of the members to the various parts involved.

The arrangement of the three sets of insulators 12, 18 and 24 is such that in any action of motion of the component mounting plate 30, there are 8 elastomeric members in shear and four in compression or tension. This provides equal spring rates for the mount assembly in all directions instead of the typical 5:1 ratio of compression to shear rate characteristic of the individual elastic isolators as found and discussed in connection with the prior art above.

To provide a mount assembly with one-half the rate of the basic configuration illustrated, six of the twelve isolators may be disconnected on one face so they cannot support shear forces. The resulting configuration allows use of common hardware for mounting either of two components that have a weight ratio of about 2:1.

The relatively large number of isolators used allows fine tuning of a mounting assembly spring rate in all directions and tailoring different ratio in different directions if required by using isolators of different durometers in a variety of arrangements. The present invention has provided an arrangement of elastomeric isolators in a balanced three axis mount with two intermediate frames. Because of the arrangement employed, the deflection in the mounting apparatus will be the same regardless of the direction of the applied forces. Loaded in the three primary directions, four of the elastomeric members will be in compression and eight will be in shear. During diagonal motion, the same ratios will be involved with some of the elastomeric members being in both shear and compression during movement. During movement, some of the elastomeric members will be primarily in compression while twice as many of the remaining sets will be primarily in shear so that the deflection in the mounting apparatus remains the same regardless of the direction of the forces applied thereto.

What is claimed is:

1. A shock mount assembly directly connected between a component to be transported and a structural body comprising:
   (a) a mounting plate connecting said component to said shock mount assembly;
   (b) attachment elements connecting said shock mount assembly to said structural body;
   (c) said shock mount assembly including first, second and third elastomeric shock members;
   (d) a first frame member spaced below said mounting plate;
   (e) said mounting plate having downward extending portions;
   (f) said first elastomeric shock member being connected between said downward extending portions of said mounting plate and said first frame member;
   (g) a second frame member spaced below said first member;
   (h) said first frame member having downward extending portions;
   (i) said second elastomeric shock member being connected between said first and second frame members;
   (j) said downward extending portions of said mounting plate and said first frame member being at right angles to each other;
   (k) said third elastomeric shock member extending downward from said second frame and connected to said structural body;
   (l) said first, second and third elastomeric shock members being connected to their respective frames in three different planes and each of said shock members being at right angles with respect to each other; and
   (m) said first, second and third elastomeric shock members all having the same operating characteristics and further being disposed so that one elastomeric member is primarily in compression and the other two elastomeric members are primarily in shear.

2. Mounting apparatus as set forth in claim 1 wherein said first, second and third sets of elastomeric members each include two pairs of elastomeric members 3. Mounting apparatus as set forth in claim 1 wherein said first, second and third sets of elastomeric members each include one pair of elastomeric members.

4. Mounting apparatus as set forth in claim 1 wherein said third set of elastomeric members include said means for securing said apparatus to said structural body and forms the mounting plane for said mounting apparatus.

* * * * *